(12) United States Patent
Sturges et al.

(10) Patent No.: US 8,378,212 B2
(45) Date of Patent: Feb. 19, 2013

(54) SEALED ELECTRICAL FEED-THROUGH ASSEMBLY AND METHODS OF MAKING SAME

(75) Inventors: James L. Sturges, Tiverton, RI (US); Robert E. Walsh, North Kingstown, RI (US); George L. Fix, Northborough, MA (US)

(73) Assignee: Raytheon Company, Waltham, MA (US)

( * ) Notice: Subject to any disclaimer, the term of this patent is extended or adjusted under 35 U.S.C. 154(b) by 392 days.

(21) Appl. No.: 12/478,160

(22) Filed: Jun. 4, 2009

(65) Prior Publication Data

US 2010/0307818 A1   Dec. 9, 2010

(51) Int. Cl.
*H01J 5/32* (2006.01)

(52) U.S. Cl. ............... 174/50.52; 174/254; 174/667; 174/50.51; 174/50.53; 174/50.54; 174/50.55; 174/50.56; 174/50.57; 174/50.58; 174/50.59; 174/50.6; 174/50.61; 174/50.62; 174/50.63; 174/50.64

(58) Field of Classification Search .......... 174/254, 174/667, 50.51–50.64
See application file for complete search history.

(56) References Cited

U.S. PATENT DOCUMENTS

| | | | |
|---|---|---|---|
| 3,328,512 A * | 6/1967 | Lembke et al. ............. 174/72 R |
| 3,721,948 A | 3/1973 | Brandt et al. | |
| 3,816,641 A * | 6/1974 | Iversen ..................... 174/76 |
| 3,980,604 A * | 9/1976 | Whiting et al. ............. 523/401 |
| 4,053,850 A * | 10/1977 | Farney et al. ............... 331/91 |
| 4,174,145 A | 11/1979 | Oeschger et al. | |
| 4,445,744 A | 5/1984 | Sedig et al. | |
| 4,865,210 A * | 9/1989 | Brainard, II .............. 220/590 |
| 5,274,603 A * | 12/1993 | Zibilich et al. ............. 367/20 |
| 5,888,083 A * | 3/1999 | Seilhan et al. ............ 439/161 |
| 5,942,333 A * | 8/1999 | Arnett et al. .............. 428/469 |
| 5,948,521 A * | 9/1999 | Dlugosch et al. .......... 428/307.3 |
| 6,165,013 A * | 12/2000 | Broussard ................. 439/606 |
| 6,240,971 B1 * | 6/2001 | Monette et al. ............. 138/153 |
| 6,716,063 B1 * | 4/2004 | Bryant et al. .............. 439/589 |
| 6,796,821 B2 * | 9/2004 | Cairns et al. .............. 439/204 |
| 6,982,383 B1 * | 1/2006 | Spellman et al. .......... 174/74 R |
| 7,029,289 B2 * | 4/2006 | Li ........................ 439/66 |

OTHER PUBLICATIONS

Tri/Austin, Inc., Bond-Coat Non-Conductive Coating (NCC), Apr. 27, 2009, pp. 1-3.

\* cited by examiner

*Primary Examiner* — Jinhee Lee
*Assistant Examiner* — James Wu
(74) *Attorney, Agent, or Firm* — Daly, Crowley, Mofford & Durkee, LLP (57) ABSTRACT

An electrical feed-through assembly and method of making an electrical feed-through assembly provide an electrical feed-through assembly that can survive exposure in a high pressure liquid, for example, seawater at least 9000 psi, for substantial periods of time, for example, twenty years, without substantial leakage of the high pressure liquid into or through the electrical feed-through assembly.

25 Claims, 5 Drawing Sheets

SEALED ELECTRICAL FEED-THROUGH ASSEMBLY AND METHODS OF MAKING SAME

STATEMENT REGARDING FEDERALLY SPONSORED RESEARCH

This invention was made with government support. The government has certain rights in the invention.

FIELD OF THE INVENTION

This invention relates generally to sealed electrical feed-through assemblies and, more particularly, to a sealed electrical feed-through assembly that has features configured to stop leaks from one or more potential leak paths.

BACKGROUND OF THE INVENTION

As is known, electrical feed-through assemblies are used in some applications under harsh environmental environments. For example, underwater electrical feed-through assemblies are used underwater in a variety of applications and to great depths and associated great pressures. Underwater, and in any high pressure fluid environment, it is recognized to be a very difficult problem to achieve an electrical feed-through assembly that does not leak, particularly when the electrical feed-through assembly is exposed to the high pressure environment for long periods of time, for example, for twenty years.

Conventional rubber O-ring seals are known to be able to survive high pressure environments without substantial leakage for shorter periods of time, but it is known that such seals tend to leak over longer periods of time.

It would, therefore, be desirable to provide an electrical feed-through assembly that can survive exposure in a high pressure liquid, for example, seawater at least 9000 psi, for substantial periods of time, for example, twenty years, without substantial leakage of the high pressure liquid into or through the electrical feed-through assembly.

SUMMARY OF THE INVENTION

In accordance with one aspect of the present invention, an electrical feed-through assembly includes a header having first and second opposing surfaces and having one or more sealed feed-through conductors passing through the header at least from the first surface to the second surface. The electrical feed-through assembly also includes a housing coupled to the header and a cured epoxy having solid glass beads mixed therein and disposed between the header and the housing.

In some embodiments, the electrical feed-through assembly can also include one or more wires coupled to the one or more sealed feed-through conductors adjacent to the first surface of the header. The one or more wires can have a wire insulation comprised of a fluorocarbon, an ethylene, a polyethylene, a propylene, a polypropylene, an olefin, a polyolefin, or an olefinic copolymer thereof. The electrical feed-through assembly can also have a cured adhesive-lined heat shrink tubing surrounding a portion of at least one of the one or more wires and a polyurethane potted structure coupled to the first surface of the header, the potted structure surrounding the one or more wires and the cured adhesive-lined heat shrink tubing. The heat shrink tubing can be comprised of a polyolefin.

In accordance with another aspect of the present invention, a method of making an electrical feed-through assembly includes providing a header having first and second opposing surfaces and having one or more sealed feed-through conductors passing through the header at least from the first surface to the second surface. The method also includes providing a housing and coupling the header to the housing with an epoxy having solid glass beads mixed therein and disposed between the header and the housing.

In some embodiments, the method can also include coupling one or more wires to the one or more feed-through conductors adjacent to the first surface of the header. The one or more wires can have a wire insulation comprised of a fluorocarbon, an ethylene, a polyethylene, a propylene, a polypropylene an olefin, a polyolefin, or an olefinic copolymer thereof. The method can also include applying an adhesive-lined heat shrink tubing to surround a portion of at least one of the one or more wires and potting a polyurethane potted structure potted to the first surface of the header, the potted structure surrounding the one or more wires and the cured adhesive-lined heat shrink tubing. The heat shrink tubing can be comprised of a polyolefin.

The above-described electrical feed-through assembly and method of making an electrical feed-through assembly provide an electrical feed-through assembly that can survive exposure in a high pressure liquid, for example, seawater at least 9000 psi, for substantial periods of time, for example, twenty years, without substantial leakage of the high pressure liquid into or through the electrical feed-through assembly.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
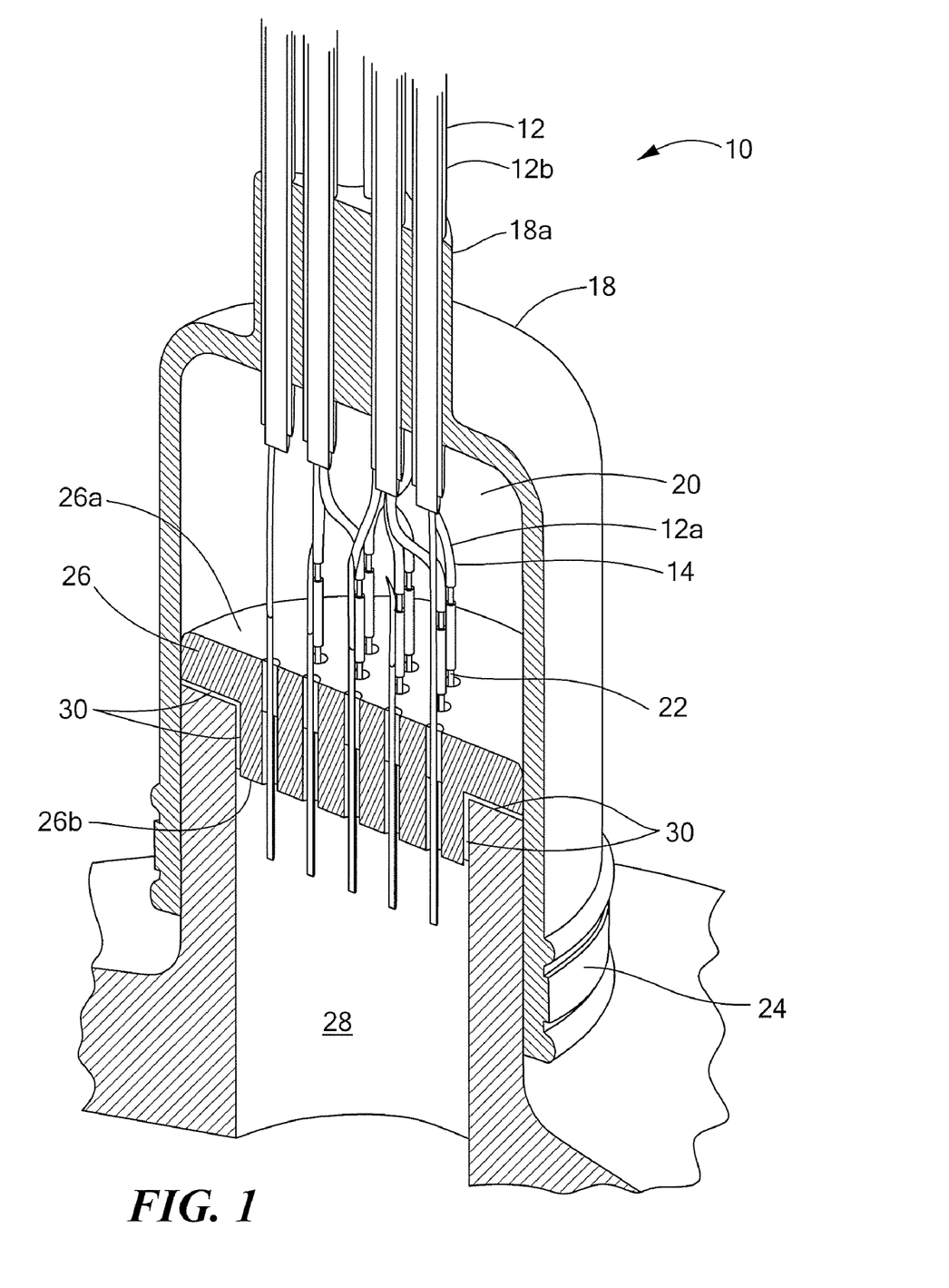
FIG. 1 is a pictorial section drawing showing an electrical feed-through assembly capable of surviving long periods of time in a high pressure liquid, wherein the electrical feed-through assembly includes a header, a housing, a boot, and one or more cables.

Referring to FIG. 1, an exemplary electrical feed-through assembly 10 includes a header 26 having first and second opposing surfaces 26a, 26b, respectively, and having one or more sealed feed-through conductors. e.g., feed-through conductor 22, passing through the header 26 at least from the first surface 26a to the second surface 26b. The electrical feed-through assembly 10 also includes a housing 28 coupled to the header 26 and a cured epoxy 30 having solid glass beads mixed therein and disposed between the header 26 and the housing 28. The cured epoxy 30 can be disposed on a variety of surfaces as shown.

In some embodiments, the electrical feed-through assembly 10 can also include one or more wires, e.g., wire 12a, coupled to the one or more feed-through conductors 22 adjacent to the first surface 26a of the header 26. The one or more wires 12a can have a wire insulation 14 comprised of a fluorocarbon, an ethylene, a polyethylene, a propylene, a polypropylene, an olefin, a polyolefin, or an olefinic copolymer thereof. For example, in some embodiments, the wire insulation 14 can be comprised of a selected one of polytetrafluoroethylene, polytetrafluoroethene, perfluoroalkoxy, fluorinated ethylene propylene, ethylene-tetrafluoroethylene, or polyvinylidene fluoride.

The electrical feed-through assembly 10 can also have a cured adhesive-lined heat shrink tubing (see, 66, FIG. 2) surrounding a potion of at least one of the one or more wires 12a and a polyurethane potted structure 20 coupled to the first surface 26a of the header 26. The potted structure 20 surrounds the one or more wires 12a and the cured adhesive-lined heat shrink tubing.

The electrical feed-through assembly 10 can also include a boot 18 disposed over the potted structure 20 and a band 24 coupling the boot 18 to the housing 28. The boot 18 can have one or more finger-like extensions of the boot 18, e.g., finger 18a. In some arrangements, the wires, e.g., the wire 12a, are within a cable 12 having a cable belt 12b or covering over the wires 12a. In some arrangements, there are two or more wires, e.g., 12a, within the cable belt 12b. In some arrangements, the two or more wires are arranged as twisted pairs of wires.

Figure 2:
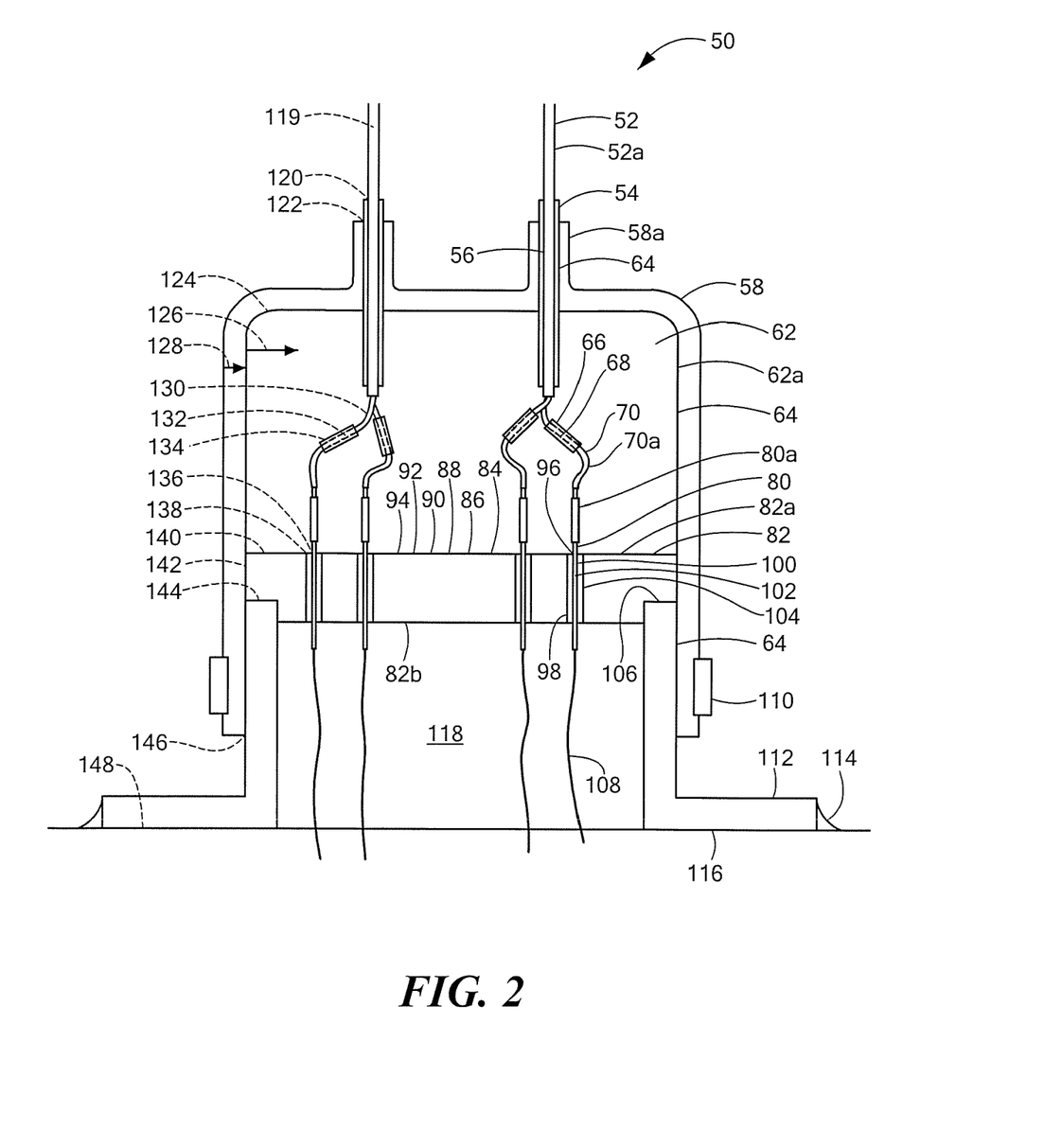
FIG. 2 is a cross section of an electrical feed-through assembly the same as or similar to the electrical feed-through assembly of FIG. 1 showing potential leak paths and showing again a header, a housing, a boot, and one or more cables.

The electrical feed-through assembly 10 is described in greater detail in conjunction with FIG. 2.

Referring now to FIG. 2, an electrical feed-through, assembly 50 can be the same as or similar to the electrical feed-through assembly 10 of FIG. 1. In FIG. 2, physical elements are indicated by reference designations with solid leader lines and potential leak paths or potential leak path entry points are indicated by reference designations with dashed leader lines.

The electrical feed-through assembly 50 includes a header 82 having first and second opposing surfaces 82a, 82b, respectively, and having one or more sealed feed-through conductors, e.g., feed-through conductor 80, passing through the header 82 at least film the first surface 82a to the second surface 82b. The electrical feed-through assembly 50 also includes a housing 112 coupled to the header 82 and a cured epoxy 106 having solid glass beads mixed therein and disposed between the header 82 and the housing 112. In some arrangements the epoxy 106 is made by Magnolia Plastics under part number 55-2.

In some embodiments as shown, the housing 112 can be joined to a pressure vessel 116 by way of a continuous weld 114 or an epoxy. However, in other embodiments, there is no such weld 114 and the housing 112 is instead a part of the pressure vessel 116.

In some embodiments, the electrical feed-through assembly 50 can also include one or more wires, e.g., wire 70, coupled to the one or more feed-through conductors, e.g. feed-through conductor 80, adjacent to the first surface 82a of the header 82. The one or more wires 70 can have a wire insulation 70a comprised of a fluorocarbon, an ethylene, a polyethylene, a propylene, a polypropylene, an olefin, a polyolefin, or an olefinic copolymer thereof. For example, in some embodiments, the wire insulation 70a can be comprised of a selected one of polytetrafluoroethylene, polytetrafluoroethene, perfluoroalkoxy, fluorinated ethylene propylene, ethylene-tetrafluoroethylene, or polyvinylidene fluoride.

The electrical feed-through assembly 50 can also have a cured adhesive-lined heat shrink tubing, e.g., heat-shrink tubing 66, surrounding a portion of at least one of the one or more wires 70. The heat shrink tubing 66 can be a polyolefin heat shrink tubing lined with a heat-cured adhesive, for example, S1030 adhesive, as manufactured by Tyco-Raychem under part number S1030.

The electrical feed-through assembly 50 can also include a polyurethane potted structure 62 coupled to the first surface 82a of the header 82. The potted structure 62 surrounds the one or more wires 70 and the cured adhesive-lined heat shrink tubing 66. The polyurethane used for the potted structure 62 can be, for example, made by PRC-DeSoto International under part number PR-1574.

The material of the potted structure 62 is selected to not stress wires, e.g., the wire 70, within the potted structure 62 when the feed-through assembly 50 is subjected to high pressure fluids. The material of the potted structure 62 is also selected to bond well to heat-shrink tubings 54, 66 and to the header 82.

The electrical feed-through assembly 50 can also include a boot 58 disposed over the potted structure 62 and a band 110 coupling the boot 58 to the housing 112. The boot 58 can have one or more fingers, e.g., finger 58a. In some arrangements, the boot 58 is comprised of a polyolefin material. In some embodiments, the boot 58 is heat shrinkable when exposed to heat.

The electrical feed-through assembly 50 can also include a cured adhesive-lined heat shrink tubing 54 surrounding a selected part of the cable belt 52a, in particular, a part of the cable belt passing through a finger 58a of the boot 58. The heat shrink tubing 54 can be a polyolefin heat shrink tubing lined with a heat-cured adhesive, for example, S1030 adhesive, as described above in conjunction with the heat-shrink tubing 66.

The boot 58 can be coupled with an adhesive 64 to the potted structure 62, coupled with the adhesive 64 to the header 82, coupled with the adhesive 64 to the housing 112, and coupled with the adhesive 64 to the heat-shrink tubings 54, 66. In some embodiments, the adhesive is the S1030 adhesive described above.

In some arrangements, the wires, e.g., the wire 70, are within a cable 52 having a cable belt 52a or covering over the wires 70. In some arrangements, there are two or more wires, e.g., 70, within the cable belt 52a. In some arrangements, the two or more wires are arranged as twisted pairs of wires.

In some arrangements, the cable belt 52a is comprised of a selected one of a fluorocarbon, an ethylene, a polyethylene, a propylene, a polypropylene, or a copolymer thereof. For example, in some embodiments, the wire cable belt 52a can be comprised of a selected one of polytetrafluoroethylene, polytetrafluoroethene, perfluoroalkoxy, fluorinated ethylene propylene, ethylene-tetrafluoroethylene, or polyvinylidene fluoride.

In some embodiments, the header 82 can include a header body 84 having one or more holes, e.g., hole 98, through the header body 84, wherein the one or more feed-through conductors, e.g., 80, are disposed within respective ones of the one or more holes, e.g., 98. A non-conductive coating (NCC) 86 can be disposed on at least the first surface 82a of the header 82. However, the NCC 86 can also be applied to other surface of the header 82 to which materials must bond, for example, the epoxy 106 and the adhesive 64.

The non-conductive coating 86 can include a metal matching layer 88 comprised of a material selected to bond to the material of the header body 84, and a ceramic layer 90 comprised of non-conducting ceramic disposed on the metal matching layer 88. The header 82 can also include an epoxy 92 impregnating pores of the ceramic layer 90.

The non-conductive coating 86 can be of a type made by TRI/Austin, Inc. under the name BOND-COAT™, wherein the metal matching layer 88 can be made by Sulzer Metco under part number 450NS for application to an aluminum substrate, Sulzer Metco part number 43C NS for application to a stainless or alloy steel substrate, or Praxair Surface Technologies part number CU-104-2 or Cu-103 for application to a copper beryllium alloy substrate. The ceramic layer can be made by Saint-Gobain Coating Solutions under part number 107. In some embodiments, the metal matching layer 88 can be about four mils thick and the ceramic layer 90 can be about ten mils thick. The epoxy 92 can be of a type made by Polyscience under the name EMBED-IT™. In some arrangements, the header body 84 is comprised of steel or aluminum, and the NCC coating 86 is selected accordingly.

In some embodiments, the header 82 can also include glass, e.g., glass 100, disposed within the one or more holes, e.g., 98, and surrounding the one or more feed-through conductors, e.g., 80, so that the one or more feed-through conductors, e.g., 80, are not in direct contact with the header body 84. The glass, e.g., 100, forms glass-to-metal seals 102, 104 at the header body 84 and at the one or more feed-through conductors, e.g., 80, respectively.

A primer layer 94 can be disposed upon the epoxy impregnation 92 of the ceramic layer 90 before the potted structure 62 is formed. The primer layer 94 can be of a type made by PRC-DeSoto International as part number PR-420, and can be applied to avoid the glass, e.g., 100. A primer layer, e.g., 96, can similarly be disposed upon an exposed surface of the glass, e.g., 100, before the potted structure 62 is formed. The primer layer 96 can be of a type made by Dow Chemicals as pail number Q1-6132, and can be applied to avoid the header body 84.

Now turning to potential leak paths identified by reference designators with dashed leader lines, potential leak paths or potential leak path entry points are described on the left hand side of FIG. 2, but in relation to corresponding physical structures on the right hand side of FIG. 2 merely to avoid overly densely spaced reference designations. Where a potential leak path entry point is shown, it will be understood that the potential leak path can occur along a joint between materials at the potential leak path entry point.

A potential leak path 119 through the cable belt, e.g., 52a, in the absence of a breach of the cable belt 52a, will have a low permeability of the surrounding fluid, for example, seawater, due to the above described selection of the material for the cable belt 52a. However, if the cable belt 52a is breached, resulting in fluid leaking into the cable, e.g. the cable 52, then the wires. e.g., the wire 70, still has a low permeability of the surrounding fluid due to the above described selection of the material for the wire insulation 70a.

However, if the cable belt is breached, a leak path 130 exists between the wires, e.g., the wire 70, and the potted structure 62. The wire insulation 70a, which is selected to have low permeability to fluid by itself, can form a relatively weak bond to the potted structure 62, resulting in the leak path 130 having a relatively high permeability to the fluid if the cable belt 52a is breached. However, the leak path 130 is blocked by the adhesive-lined heat-shrink tubing, e.g., 66, such that leak paths 132, 134 into and around the heat shrink tubing have very low permeability to the fluid. Essentially, the leak path 132 is blocked by the heat-cured adhesive, e.g., 68, and the leak path 134 at the outside of the heat-shrink tubing 66 is blocked by a superior bond between the material of the heat shrink tubing and the potted structure 62.

It will be recognized that if the cable belt 52a is breached to the point where the wire insulation 70a is also breached, a conductor within the wire 70 will contact the surrounding fluid, resulting in low electrical resistance to fluid ground. However, other conductors (solid or stranded) will maintain a high electrical resistance to fluid ground due to the lack of leak path 140. This is blocked by the bonded interface between the potted structure 62 and the glass 100 and between the potted structure 62 and the header body 84.

A potential leak path 120 between the heat shrink tubing 54 and the cable belt 52a is blocked by the heat-cured adhesive within the heat shrink tubing 54. A potential leak path 122 around the heat shrink tubing 54 is blocked by the adhesive 64 between the boot finger 58a and the heat shrink tubing 54.

As is known, some materials tend to be permeable, meaning that they tend to transmit or leak gases or vapors such as water vapor on a molecular level. A potential leak path 128 is indicative of a vapor transmission path directly through the boot 58. The above-described material of the boot 58 is selected to have very low permeability to water vapor. A potential leak path 126 is indicative of a vapor transmission path directly through the potted structure 62. The above-described material of the potted structure 62 also has very low permeability to water vapor.

A potential leak path 146 is blocked by the adhesive 64. A potential leak path 144 existing if the potential leak path 146 or other potential leak paths fails, is blocked by the above-described epoxy 106 filled with solid glass beads.

An epoxy tends to have the greatest bond strengths for bond thicknesses within certain minimum and maximum bounds that depend upon the type of epoxy. The solid glass beads within the epoxy 106 assure that the bond thickness of the epoxy 106 stays within those bounds, even when under the continual load of long-term exposure to high pressure. In some embodiments, the glass beads have a diameter of between about five and seven mils, which is suited for the above-described Magnolia 55-2 epoxy. However, glass beads with diameters greater than seven mils and less then five mils can also be used. In some embodiments, the amount of glass beads within the epoxy adhesive 106 is selected to be about four percent by weight, that having been determined to be an optimum concentration for bearing very high loadings. However, percentages higher or lower than four percent can also be used. It will be understood that, for the exemplary epoxy, Magnolia 55-2, a concentration of four percent by weight is equivalent to a concentration of about 1.8 percent by volume.

A potential leak path 142 is blocked by the adhesive 64 and a leak path 140 is blocked by adherence of the potted structure 62 to the header body 84, which is enhanced by use of the NCC coating 86 and the above-described primer 94.

Potential leak paths 136 and 138 are blocked by the glass-to-metal seals 102, 104.

A region 118 within the housing 112 can be hollow or can be filled or partially filled with another polyurethane potted structure (not shown) to provide strain relief for inboard wiring, e.g., wire 108.

A potential leak path 148 can be sealed by the weld 114 or it cannot exist at all in embodiments where the housing 112 is part of the pressure vessel 116.

Figure 3:
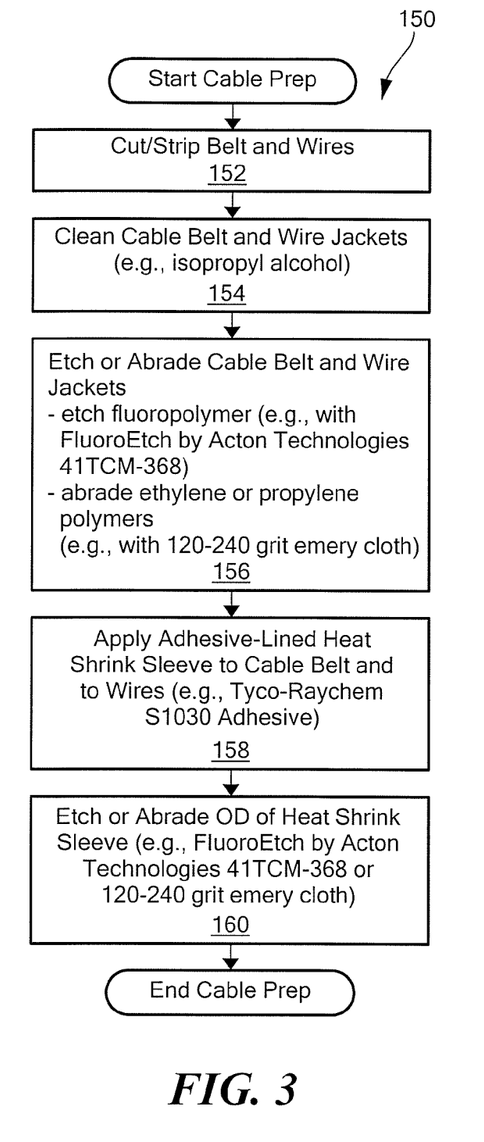
FIG. 3 is a flow chart showing a process for preparing the cables of the electrical feed-through assemblies of FIGS. 1 and 2.
Figure 3A:
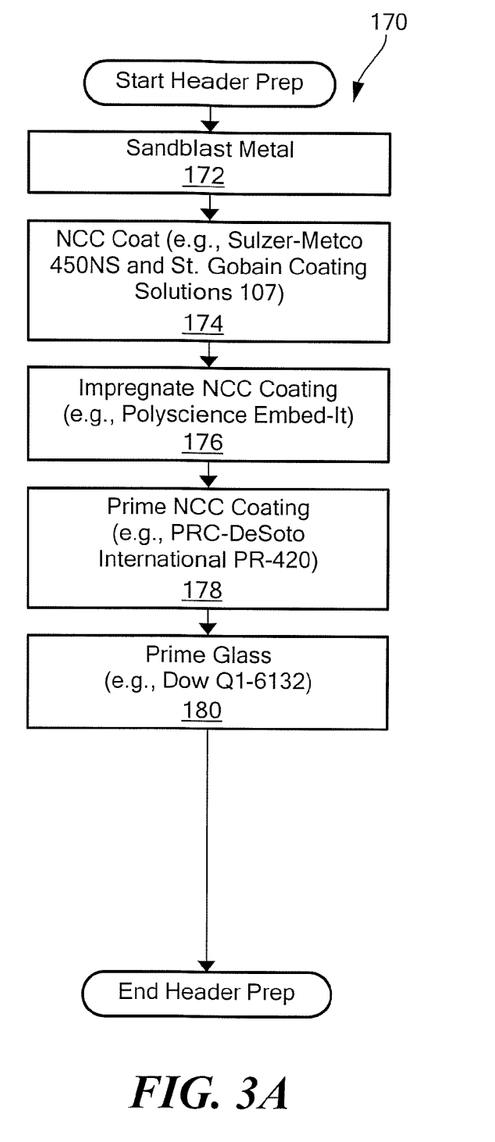
FIG. 3A is a flow chart showing a process for preparing the headers of the electrical feed-through assemblies of FIGS. 1 and 2.
Figure 3B:
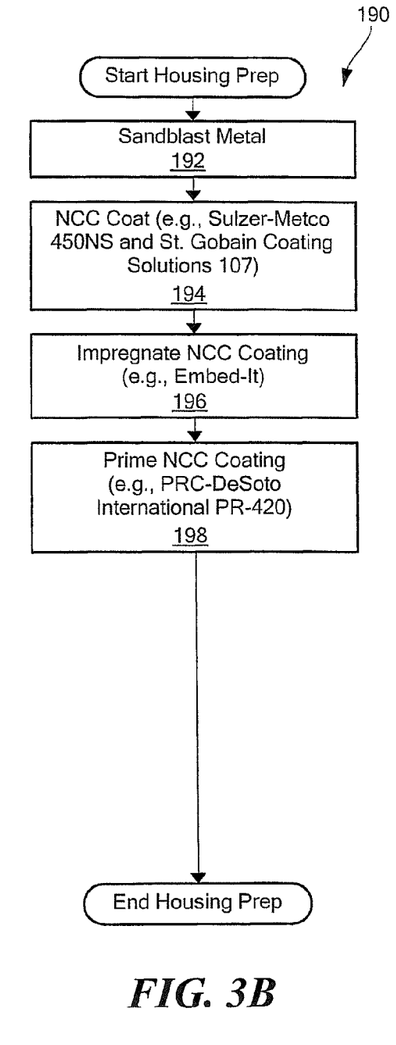
FIG. 3B is a flow chart showing a process for preparing the housings of the electrical feed-through assemblies of FIGS. 1 and 2.
Figure 3C:
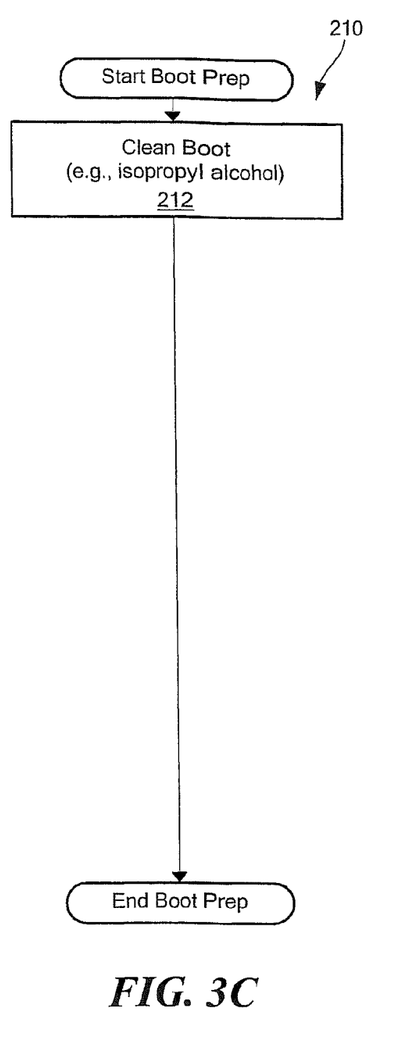
FIG. 3C is a flow chart showing a process for preparing the boots of the electrical feed-through assemblies of FIGS. 1 and 2.
Figure 4:
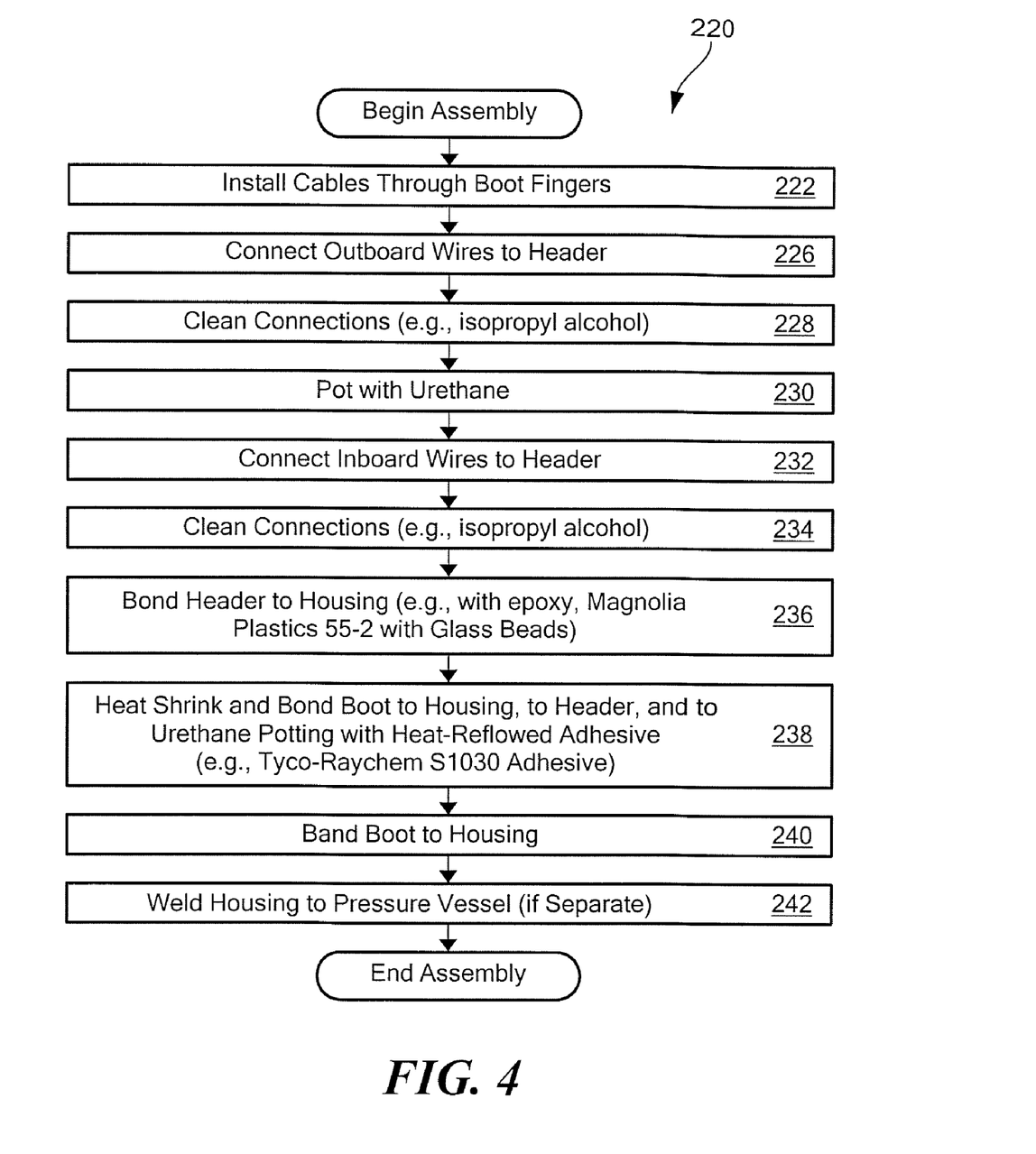
FIG. 4 is a flow chart showing a process for assembling the electrical feed-through assembly of FIGS. 1 and 2.

FIGS. 3-3C show flow charts representative of steps that can be taken to prepare pairs of the feed-through assembly 50 of FIG. 2. FIG. 4 shows a flow chart representative of a final assembly of the feed-through assembly 50. While preparation steps of FIGS. 3-3C are indicative of preparation steps being performed prior to final assembly for clarity, it should be recognized that some of these steps can be performed during final assembly of FIG. 4 rather than before final assembly. Order of steps associated with FIGS. 3-3C and 4 can be modified without departing from the spirit of the invention.

Referring now to FIG. 3 and to FIG. 2, a process 150 is indicative of preparation of the cable 52 of FIG. 2. At block 152, the cable 52 is cut and stripped to provide the wires, e.g., the wire 70, exposed from the cable belt 52a. End of the wires 70 are stripped to allow solder joints to the feed-through conductors, e.g., 80.

At block 154, the cable belt 52a and the wire jackets 70a are cleaned with a solvent, for example, isopropyl alcohol.

At block 156, for embodiments in which the wire jackets are fluoropolymer wire jackets, the wire jackets 70a can be etched, for example, with Fluoroetch by Acton Technologies, part number 41TCM-368. However, at block 156, for embodiments in which the wire jackets are ethylene or propylene polymer wire jackets, the wire jackets 70a can be abraded, for example, with emery cloth having a grit between about 120 and 240.

At block 158, the adhesive-lined heat shrink tubings, e.g., 54, 66, are applied and heat cured to the cable belt 52a and to the wires 70, respectively.

At block 160, the outer surface of the heat shrink tubings 54, 66 can be abraded, for example, with emery cloth having a grit between about 120 and 240, or alternatively, etched.

Referring now to FIG. 3A and to FIG. 2, a process 170 is indicative of preparation of the header 82 of FIG. 2. The process 170 does not show steps to install the glass 100 and pins 80 within the header body 84. The metal of the header body 82 is sandblasted after the glass 100 is disposed in the holes 98 in block 172.

At block 174, the NCC coating 86 is applied as a metal matching layer 88 and a ceramic layer 90 (Sulzer Metco 450NS for aluminum substrates. Sulzer Metco 43C NS for steel alloy substrates, Praxair CU-104-2 for copper beryllium alloy substrates, and Saint-Gobain 107, respectively) and at block 176, the ceramic layer 90 is impregnated, for example with the above described epoxy 92. The impregnation can be formed in a multistep process. For example, the epoxy impregnation 92 can be applied to selected surfaces of the header 82 having the ceramic layer 90 and a vacuum can then be applied to draw gasses out of the porosity of the ceramic layer 90. Subsequent relaxation of the vacuum forces the epoxy 92 into the ceramic layer 90. Once cured, the epoxy impregnation 92 can be cleaned from the surface of the ceramic layer 90, for example, by abrading or by light sand blasting.

At block 178, selected surfaces of the header 82 are primed, for example with the above-described primer coating 94.

At block 180, selected surfaces of the glass 100 are primed, for example, with the above-described primer coating 96.

Optionally, selected surfaces of the header 82 can be pre-coated with polyurethane, for example, the same material as the potted structure 62, before the potted structure 62 is formed.

Referring now to FIG. 3B and to FIG. 2, a process 190 is indicative of preparation of the housing 112 of FIG. 2. At block 192, the housing 112 can be sandblasted. At blocks 194-198 the housing 112 can be NCC coated, impregnated, and primed in the same way at that described above in conjunction with boxes 174-178 of FIG. 3A.

Referring now to FIG. 3C and to FIG. 2, a process 210 is indicative of preparation of the boot 58 of FIG. 2. At block 212, interior surfaces of the boot 58 can be cleaned with a solvent, for example with isopropyl alcohol.

Referring now to FIG. 4 and to FIG. 2, a process 220 is indicative of an assembly of the prepared parts, prepared in the processes of FIGS. 3-3C. At block 222, the cable 52 can be installed through the boot 58, i.e. through the boot fingers 58a.

At block 226, outboard wires, e.g., wire 70, can be attached with solder to the header 82, i.e., to the feed-through conductor 80.

At block 228, the outboard solder joints can be cleaned with a solvent, for example, isopropyl alcohol.

At block 230, the potted structure 62 is formed. The potting can occur in a vacuum, to ensure that gasses in the potting material are expelled and do not form voids in the potted structure 62.

At block 232, inboard wires, e.g., wire 108, can be attached with solder to the other ends of the feed-through conductors, e.g., 80. The inboard wires are within the pressure vessel 116.

At block 234, the inboard solder joints can be cleaned with a solvent, for example, isopropyl alcohol.

At block 236, the header 82 can be bonded to the housing 112 with solid glass bead filled epoxy 106 described more fully above.

At block 238, the surfaces of the potted assembly 58, and selected surfaces of the housing 112 and the header 82 can be coated with adhesive 64, for example, the above described heat-cured or heat-reflowed S1030 adhesive, or the adhesive 64 can be pre-applied to the inside surfaces of the heat shrink boot 58, and the adhesive can be heat cured or reflowed to the potted structure 62, header 82, and housing 112. When heat curing, the cables 52 can be protected from the applied heat. In some embodiments, prior to heat curing the boot 58, the adhesive can also be applied to the inside of the boot fingers, e.g., 58a, and/or to the heat shrink tubing, e.g., 54 over the cable belts, e.g., 52a.

At block 240, the boot 58 can be further coupled to the housing 112 with a band 110.

At block 242, for arrangements is which the housing 112 is not a part of the pressure vessel, the housing 112 can be welded to the pressure vessel 116 with a weld 114.

While certain materials and material layers are described above, it will be appreciated that other materials and material layers can be used so long as bonds between the various parts of the feed-through assembly 50 have sufficient strength to form water blocks under desired combinations of type of fluid and fluid pressure. The above described materials, material layers, and preparations can be used for the feed-through assembly 50 when used in seawater to a pressure of at least 9000 psi for a time period of at least twenty years.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An electrical feed-through assembly, comprising:
   a header having first and second opposing surfaces and having one or more sealed feed-through conductors passing through the header at least from the first surface to the second surface;
   a housing coupled to the header; and
   a cured epoxy having solid glass beads mixed therein and disposed between the header and the housing, wherein the glass beads have a diameter and a concentration selected to result in the cured epoxy remaining within a predetermined range of thicknesses of the cured epoxy when the electrical feed-through assembly is exposed to a high pressure liquid from outside of the electrical feed-through assembly, the selection made so that the high pressure liquid will not pass through the epoxy, wherein the concentration of the glass beads is about four percent by weight, wherein the glass beads have diameters in the range of about five to seven mils, and wherein the header comprises:
- a non-conductive coating disposed on at least the first surface of the header, wherein the non-conductive coating comprises:
  - a metal matching layer comprised of a material selected to bond to the material of the header;
  - a ceramic layer of non-conducting ceramic disposed on the metal matching layer; and
  - an epoxy substantially impregnating pores of the ceramic layer, wherein the epoxy is operable to eliminate a leak path through the ceramic layer when the electrical feed-through assembly is exposed to the high pressure liquid.

2. The electrical feed-through assembly of claim 1, further comprising:
- one or more wires coupled to the one or more feed-through conductors adjacent to the first surface of the header, wherein the one or more wires have a wire insulation comprised of a fluorocarbon, an ethylene, a polyethylene, a propylene, a polypropylene, an olefin, a polyolefin, or an olefinic copolymer thereof;
- a cured adhesive-lined heat shrink tubing surrounding a portion of at least one of the one or more wires, wherein the heat shrink tubing is comprised of a polyolefin; and
- a polyurethane potted structure coupled to the first surface of the header, the potted structure surrounding the one or more wires and the cured adhesive-lined heat shrink tubing.

3. The electrical feed-through assembly of claim 2, wherein the wire insulation is an etched or abraded wire insulation.

4. The electrical feed-through assembly of claim 2, wherein the one or more wires comprises at least two wires, wherein a plurality of the at least two wires is disposed within a cable belt.

5. The electrical feed-through assembly of claim 4, wherein the cable belt is comprised of a selected one of a fluorocarbon, an ethylene, a polyethylene, a propylene, a polypropylene, an olefin, a polyolefin, or an olefinic copolymer thereof.

6. The electrical feed-through assembly of claim 5, wherein the cable belt is an etched or abraded cable belt.

7. The electrical feed-through assembly of claim 4, further comprising a cured adhesive-lined heat shrink tubing surrounding a selected part of the cable belt, wherein the heat shrink tubing is comprised of a polyolefin.

8. The electrical feed-through assembly of claim 7, further comprising a cured adhesive-lined heat shrink boot coupled with an adhesive to the potted structure, coupled with the adhesive to the header, coupled with the adhesive to the housing, and coupled with the adhesive to the heat shrink tubing surrounding the cable belt, wherein the boot is comprised of a polyolefin.

9. The electrical feed-through assembly of claim 2, wherein the header further comprises:
- one or more holes through the header, wherein the one or more feed-through conductors are disposed within respective ones of the one or more holes; and
- glass disposed within the one or more holes and surrounding the one or more feed-through conductors so that the one or more feed-through conductors are not in direct contact with the header body, wherein the glass forms glass-to-metal seals at the header body and at the one or more feed-through conductors.

10. The electrical feed-through assembly of claim 1, wherein the header further comprises:
- one or more holes through the header, wherein the one or more feed-through conductors are disposed within respective ones of the one or more holes; and
- glass disposed within the one or more holes and surrounding the one or more feed through conductors so that the one or more feed-through conductors are not in direct contact with the header body, wherein the glass forms glass-to-metal seals at the header body and at the one or more feed-through conductors.

11. A method of making an electrical feed-through assembly, comprising;
- providing a header having first and second opposing surfaces and having one or more sealed feed-through, conductors passing through the header at least from the first surface to the second surface;
- providing a housing; and
- coupling the header to the housing with an epoxy having solid glass beads mixed therein and disposed between the header and the housing, wherein the glass beads have a diameter and a concentration selected to result in the cured epoxy remaining within a predetermined range of thicknesses of the cured epoxy when the electrical feed-through assembly is exposed to a high pressure liquid from outside of the electrical feed-through assembly, the selection made so that the high pressure liquid will not pass through the epoxy, wherein the concentration of the glass beads is about four percent by weight, wherein the glass beads have diameters in the range of about five to seven mils, and wherein the providing the header comprises:
  - depositing a non-conductive coating on at least the first surface of the header, wherein the depositing the non-conductive coating comprises:
    - depositing a metal matching layer on the header comprised of a material selected to bond to the material of the header;
    - depositing a ceramic layer on the metal matching layer comprised of non-conducting ceramic; and
    - substantially impregnating pores of the ceramic layer with an epoxy, wherein the epoxy is operable to eliminate a leak path through the ceramic layer when the electrical feed-through assembly is exposed to the high pressure liquid.

12. The method of claim 11, further comprising:
- coupling one or more wires to the one or more feed-through conductors adjacent to the first surface of the header, wherein the one or more wires have a wire insulation comprised of a fluorocarbon, an ethylene, a polyethylene, a propylene, a polypropylene, an olefin, a polyolefin, or an olefinic copolymer thereof;
- applying an adhesive-lined heat shrink tubing to surround a portion of at least one of the one or more wires, wherein the heat shrink tubing is comprised of a polyolefin; and
- potting a polyurethane potted structure to the first surface of the header, the potted structure surrounding the one or more wires and the cured adhesive-lined heat shrink tubing.

13. The method of claim 12, further comprising etching the wire insulation or abrading the wire insulation.

14. The method of claim 12, wherein the one or more wires comprises at least two wires, wherein a plurality of the at least two wires is disposed within a cable belt.

15. The method of claim 14, wherein the cable belt is comprised of a fluorocarbon, an ethylene, a polyethylene, a propylene, a polypropylene, an olefin, a polyolefin, or an olefinic copolymer thereof.

16. The method of claim 15, further comprising etching the cable belt or abrading the cable belt.

17. The method of claim 14, further comprising applying and curing an adhesive lined heat shrink tubing to surround a selected part of the cable belt, wherein the heat shrink tubing is comprised of a polyolefin.

18. The method of claim 17, further comprising adhering an adhesive-lined heat shrink boot with the an adhesive to the potted structure, adhering with the adhesive to the header, adhering with the adhesive to the housing, and adhering with the adhesive to the heat-shrink tubing surrounding the cable belt, wherein the boot is comprised of a polyolefin.

19. The method of claim 12, wherein the header further comprises:
 one or more holes through the header, wherein the one or more feed-through conductors are disposed within respective ones of the one or more holes, the method further comprising:
 depositing glass within the one or more holes and surrounding the one or more feed through conductors so that the one or more feed-through conductors are not in direct contact with the header body, wherein the glass forms glass-to-metal seals at the header body and at the one or more feed-through conductors.

20. The method of claim 11, wherein the header further comprises:
 a header body having one or more holes through the header body, wherein the one or more feed-through conductors are disposed within respective ones of the one or more holes, the method further comprising:
 depositing glass within the one or more holes and surrounding the one or more feed-through conductors so that the one or more feed-through conductors are not in direct contact with the header body, wherein the glass forms glass-to-metal seals at the header body and at the one or more feed-through conductors.

21. The electrical feed-through assembly of claim 1, wherein the housing comprises:
 a non-conductive coating disposed on a surface of the housing, wherein the non-conductive coating comprises:
 a metal matching layer comprised of a material selected to bond to the material of the housing;
 a ceramic layer of non-conducting ceramic disposed on the metal matching layer; and
 an epoxy substantially impregnating pores of the ceramic layer.

22. The method of claim 11, wherein the providing the housing comprises:
 depositing a non-conductive coating on a surface of the housing, wherein the depositing the non-conductive coating comprises:
 depositing a metal matching layer on the housing comprised of a material selected to bond to the material of the housing;
 depositing a ceramic layer on the metal matching layer comprised of nor conducting ceramic; and
 substantially impregnating pores of the ceramic layer with an epoxy.

23. The method of claim 11, wherein the substantially impregnating comprises:
 applying the epoxy to the ceramic layer; and
 applying a vacuum to the ceramic layer and to the epoxy.

24. The electrical feed-through assembly of claim 1, wherein the high pressure liquid has a pressure of at least 9000 pounds per square inch.

25. The method of claim 11, wherein the high pressure liquid has a pressure of at least 9000 pounds per square inch.

* * * * *